United States Patent [19]
Hirose

[11] Patent Number: 5,917,915
[45] Date of Patent: *Jun. 29, 1999

[54] SCRAMBLE/DESCRAMBLE METHOD AND APPARATUS FOR DATA BROADCASTING

[75] Inventor: Masaki Hirose, Tokyo, Japan

[73] Assignee: Sony Corporation, Tokyo, Japan

[ * ] Notice: Under 35 U.S.C. 154(b), the term of this patent shall be extended for 122 days.

[21] Appl. No.: 08/492,643

[22] Filed: Jun. 20, 1995

[30] Foreign Application Priority Data

Jun. 24, 1994 [JP] Japan ................................. 6-142742

[51] Int. Cl.⁶ ........................................................ H04L 9/00
[52] U.S. Cl. .................................. 380/49; 380/9; 380/10; 455/3.1; 455/6.3
[58] Field of Search .............................. 380/4, 9, 10, 16, 380/18, 28, 49, 50, 23; 348/6, 7, 10; 455/3.1, 3.2, 4.1, 4.2, 6.1, 6.3

[56] References Cited

U.S. PATENT DOCUMENTS

| | | | |
|---|---|---|---|
| 4,677,434 | 6/1987 | Fascenda | 380/23 |
| 4,677,552 | 6/1987 | Sibley, Jr. | 380/238 X |
| 5,282,249 | 1/1994 | Cohen et al. | 380/23 |
| 5,406,626 | 4/1995 | Ryan | 380/9 |

*Primary Examiner*—Bernarr E. Gregory
*Attorney, Agent, or Firm*—Limbach & Limbach L.L.P.

[57] ABSTRACT

A transmitter for transmitting news data via satellite and which includes an information storage unit for storing news data, an information scramble processing unit for scrambling the news data using a predetermined first key to output once scrambled news data, a data scrambler for scrambling the once scrambled news data using a predetermined second key and outputting twice scrambled news data, a transmitter for broadcasting the twice scrambled news data via a transmitter antenna to a receiver which includes a data descrambler for descrambling the twice scrambled news data using the second key and outputting once descrambled news data, a storage medium for storing the once descrambled news data, an information descramble processing unit for reading the once descrambled data from the recording medium and descrambling the once descrambled news data using the first key to produce fully descrambled news data, and a user terminal for reading the fully descrambled news data.

17 Claims, 12 Drawing Sheets

EMBODIMENT OF SCRAMBLE PROCESS IN CASE OF APPLICATION OF ELECTRONIC MAGAZINE SERVICE

SCRAMBLE/DESCRAMBLE METHOD AND APPARATUS FOR DATA BROADCASTING

FIELD OF THE INVENTION

The present invention relates to a scramble system for use in satellite broadcasting of text and graphical information, such as that which might be found in a typical newspaper, magazine or book.

BACKGROUND OF THE INVENTION

In, for instance, a pay television broadcasting system(or a music/audio program broadcasting system) by way of a broadcasting satellite, programs are often scrambled, or encoded, for broadcast so as to prevent these programs from being illegally intercepted by unauthorized parties. A person who wishes to become an authorized viewer/listener, or contractor(subscriber), of such a pay television program typically must contract with a programming service provider for such service. Upon contracting for service, the subscriber typically receives a scramble key (decrypt key) or code, so that he/she may descramble the scrambled program to legally listen to the pay TV program.

Nowadays, so-called "COATEC" system and the "SKY-PORT" system have been practically utilized as a scramble system in pay television broadcasting via broadcasting satellites.

Recently, as a data broadcasting system for electronically distributing data such as newspaper (news data or newspaper data), such a broadcasting system has been proposed that newspaper data is inserted into a satellite data channel, and the resultant data is transmitted through the broadcasting satellite. In this case, for instance, at a data receiving apparatus installed in a contractor's (subscriber's)home/reception location who has made the newspaper data distribution contract with the newspaper data supplied, a signal transmitted through a satellite is received to derive the newspaper data inserted into the data channel. Then, this newspaper data is recorded on such a recording medium as a magnetic disk and a magneto optical disk, and is read out therefrom if necessary. The read newspaper data is represented on, for instance, a display unit, or printed out, so that the contractor can read the newspaper.

In other words, according to the above-described scramble system, since the programs are transmitted by only selecting one of the two transmission data processing methods, namely by scrambling the program data or by processing the program data in the non-scramble manner, merely uniform program service may be provided so that all of the contractors can observe the specific newspaper data and is not possible that some contractors cannot observe this specific newspaper data.

Currently existing services provide subscribers with textual news data via computer network. Such information is typically provided to the subscribers regardless of the subscribers' interest or desire in receiving all types of news data. In other words, when subscribers subscribe to such a news service they receive, or have access to, all news data of all types or categories, regardless of their desire to receive or not receive certain news data. In essence, the subscriber typically pays for more news data than they actually use or receive. As a result, all of the contractors must pay their service fees regardless of whether or not they actually observe the broadcasted newspaper data. Accordingly, in the view of the contractors, they must pay not only the service fees for the necessary newspaper data, but also the service fees for the unnecessary newspaper data, so that they may feel an unfair fee payment system. This unfair fee payment system could impede promotion of the program contract, and furthermore could lower the profit of the information suppliers.

In the above-described scramble system, a scramble key is required to decrypt the scrambled program when the scrambled program is received. As a consequence, for instance, if the newspaper data (namely, scrambled newspaper data) have been received prior to the establishment of a contract are recorded on the recording medium, after the establishment of the contract, even if the contractor may have his own scramble key, he cannot decrypt the scrambled newspaper data which have been recorded on this recording medium.

SUMMARY OF THE INVENTION

The present invention has been made to solve these problems, and therefore, has an object to provide a scramble apparatus and a descramble apparatus, which are suitable for a data broadcasting system, and therefore are capable of providing various sorts of services.

The present invention is directed to providing satellite or cable broadcast of, for example, news data such as that which is commonly available in a printed form such as, for example, a newspaper or magazine. This news data may be of various forms, including textual data or photographic/image data. Further, in the present invention, information such as sound clips, or audio, as well as full motion video data, can be transmitted as news data.

As with typical printed publications, the present invention contemplates that news data, of whatever form, be classified, or categorized, into various types/categories of news data. For example, news data relating to sports information may be categorized as "sports" data, or news data relating to business information may be categorized as "business" data. Likewise, news data may be classified/categorized by the source or publisher of the news data. Of course any other number of categories can be defined and used to classify news data as needed.

The present invention seeks to allow a subscriber, or authorized party, to receive news data via, for example, broadcast satellite transmission, in a manner which precludes reception of any transmitted news data by unauthorized parties and further, precludes parties authorized to receive some types of news data from receiving other available types of news data which they have not subscribed to receive or paid for.

The present invention provides for a method of transmitting data, such as news data via an electronic network, such as a broadcast satellite system, or cable television network, local area network, or the like. The method of the present invention includes assemblying news data, on a transmission side, news data and categorizing the news data into various predetermined categories (types). The categorized news data is then stored into a storage medium such as a computer storage memory. The computer storage memory may constitute an optical disk, hard drive or magnetic tape or disk medium. The categorized news data is then retrieved from the storage medium. Each type of news data is encoded according to a unique predetermined encryption key (first key data) associated with each type of news data. That is, each type of news data is encoded/encrypted with different first key data. Then, the encoded (or encrpyted) news data is encoded again using a second predetermined encryption key (second key data). This second encryption key, however, is common to all types of news data. The twice encoded news data is then transmitted via, for example, a broadcast satellite to a receiver. Upon reception of the broadcast signal, the twice encoded news data is de-crypted (decoded) using the common (or second) encryption key data used to encrypt the encoded news data prior to transmission. As a result the encrpyted news data is yeilded. Next, the encrypted news data is decoded using the unique (or first)encryption key data used to encode news data prior to transmission. As a result, fully decoded news data is yeilded which may then be viewed/accessed in proper format by the subscriber. In the preferred embodiment, the second encryption key data is made available only to the receiver side of authorized subscribers and the first encryption key data is available to authorized subscribers who have subscribed to receive a particular type/category of news data.

A scramble apparatus according to the present invention comprises and entire scramble means (e.g., data scrambler 14 shown in FIG. 3) for scrambling an entire portion of the data, and block unit scramble means (e.g., information unit scramble processing unit 27 shown in FIG. 2) for selectively scrambling the data in a preselected block unit.

In this scramble apparatus, the entire portion of data scrambled in a preselected block unit by the block unit scramble means can be scrambled by the entire scramble means. When the data is constructed of data in a preselected file unit, this data can be scrambled in the file unit by the block unit scramble means.

One embodiment of this descramble apparatus is characterized by comprising an entire descramble means (e.g., data scrambler 87 shown in FIG. 5) for descrambling the entire portion of data scrambled by the entire scramble means, and block unit descramble means (e.g., information unit scramble processing unit 31 of FIG. 6) for descrambling the data scrambled in a predetermined block unit by the block unit scramble means.

In this descramble apparatus, when this apparatus further includes storage means (e.g., recording medium 8 shown in FIG. 6) for storing the data descrambled by the entire descramble means, the data stored in the storage means is descrambled by the block unit descramble means. When this apparatus further includes read means (e.g., IC card interface apparatus 111 shown in FIG. 11) for reading a scramble key from the storage medium for storing the scramble key used to descramble the data scrambled in the predetermined block unit by the block unit scramble means, the data can be descrambled by the block unit descramble means with employment of the scramble key read from the read means.

When this apparatus further includes ID storage means (memory 83 shown in FIG. 5) for storing the unique ID, and also the storage medium stores a preselected ID in addition to the scramble key, the scramble key is allowed to be read from the storage medium only if the ID stored in the ID storage means is coincident with the ID stored in the storage medium.

In accordance with the scramble apparatus of the present invention, the data is selectively scrambled in a predetermined block unit, and further the entire portion of data are scrambled. As a consequence, it is possible to provide only desirable data to the proper contractor.

In accordance with the descramble apparatus of the present invention, the entire portion of scrambled data is descrambled, and further the data scrambled in a preselected block unit is descrambled with respect to this data. Accordingly, the contractor can receive only his desirable data.

BRIEF DESCRIPTION OF THE DRAWINGS

For a better understanding of the present invention, reference is made of the detailed description to be read in conjunction with the accompanying drawings, in which.

DETAILED DESCRIPTION OF THE PREFERRED EMBODIMENTS

Figure 1:
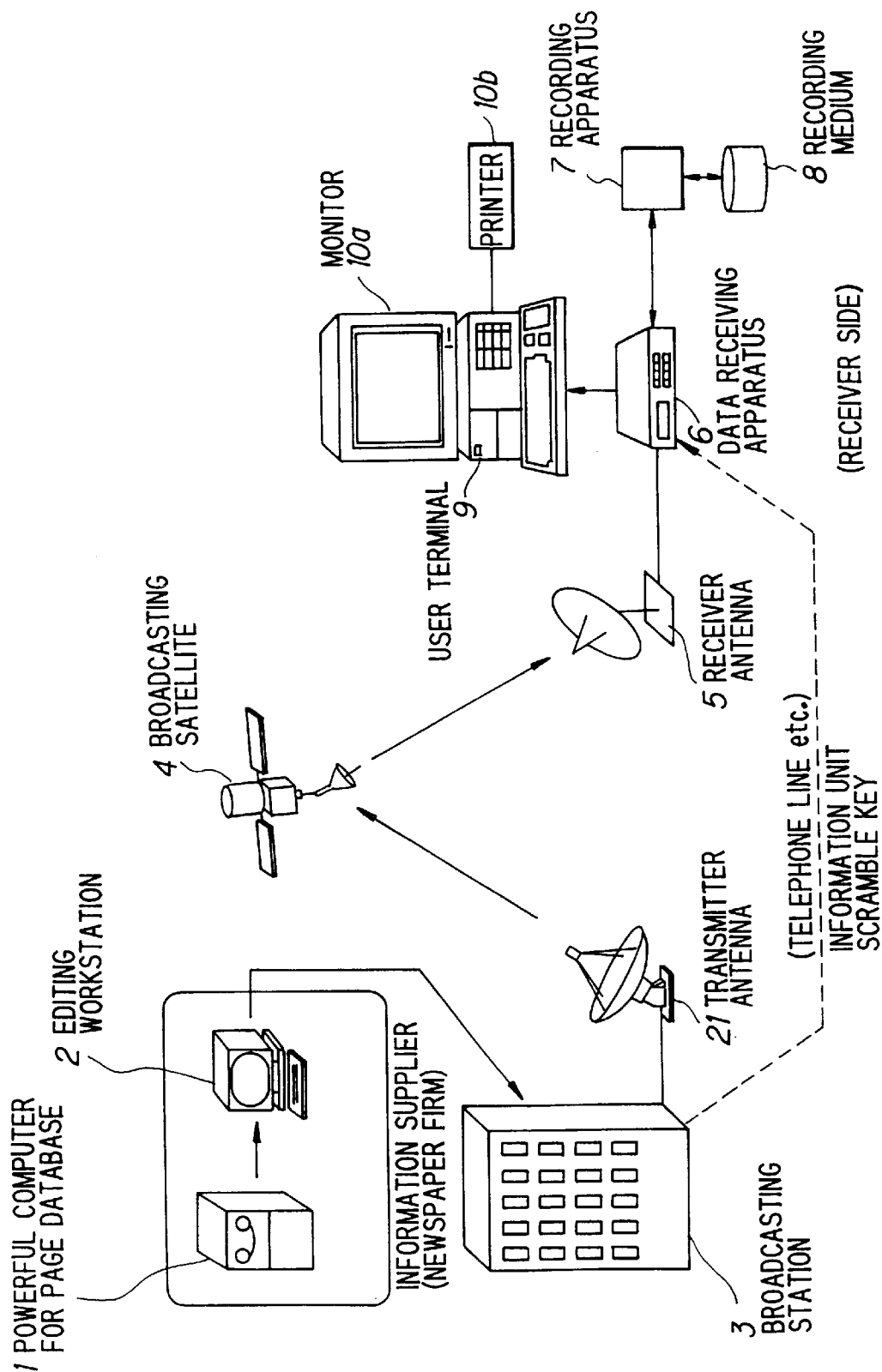
FIG. 1 schematically shows an overall arrangement of a data broadcasting system to which the present invention has been applied.

In FIG. 1, there is shown an example of an overall arrangement of a data broadcasting system to which the present invention has been applied. An information supplier, such as a newspaper, publisher, or the like, uses a computer 1 to store and maintain a page database. This page database contains news article information and layout information which might be also be printed in a newspaper, a magazine, or the like. News article information may include text data as well as graphic or photographic data. The news data stored in the page database is transferred to a workstation 2 when required, and may be, edited thereby, as desired.

That is, the data stored in the database may be edited to produce news article data in a predetermined format, with respect to each of the news pages, which can be easily retrieved by a receiver (program contractor or subscriber) end. For example, with this editing work station, such a retrieval screen is formed in which a size of a certain page is directly reduced without changing a layout thereof, while an index can be observed. Furthermore, a relationship between the retrieval screen (index) and the detailed articles thereof is established in order that the relevant article can be displayed from this index. Then, such data which have been edited as the formats easily retrievable at the receiver ends are transmitted via, for instance, a ground data line to a broadcasting station 3.

As will be described later, the data (news data or newspaper data) transferred to the broadcasting station 3 are inserted into, for example, the data channel of the satellite, and then the resultant data are transmitted via a satellite (Broadcasting Satellite, or Communication Satellite) 4 to the receiver ends (e.g., contractor/subscriber).

Figure 2:
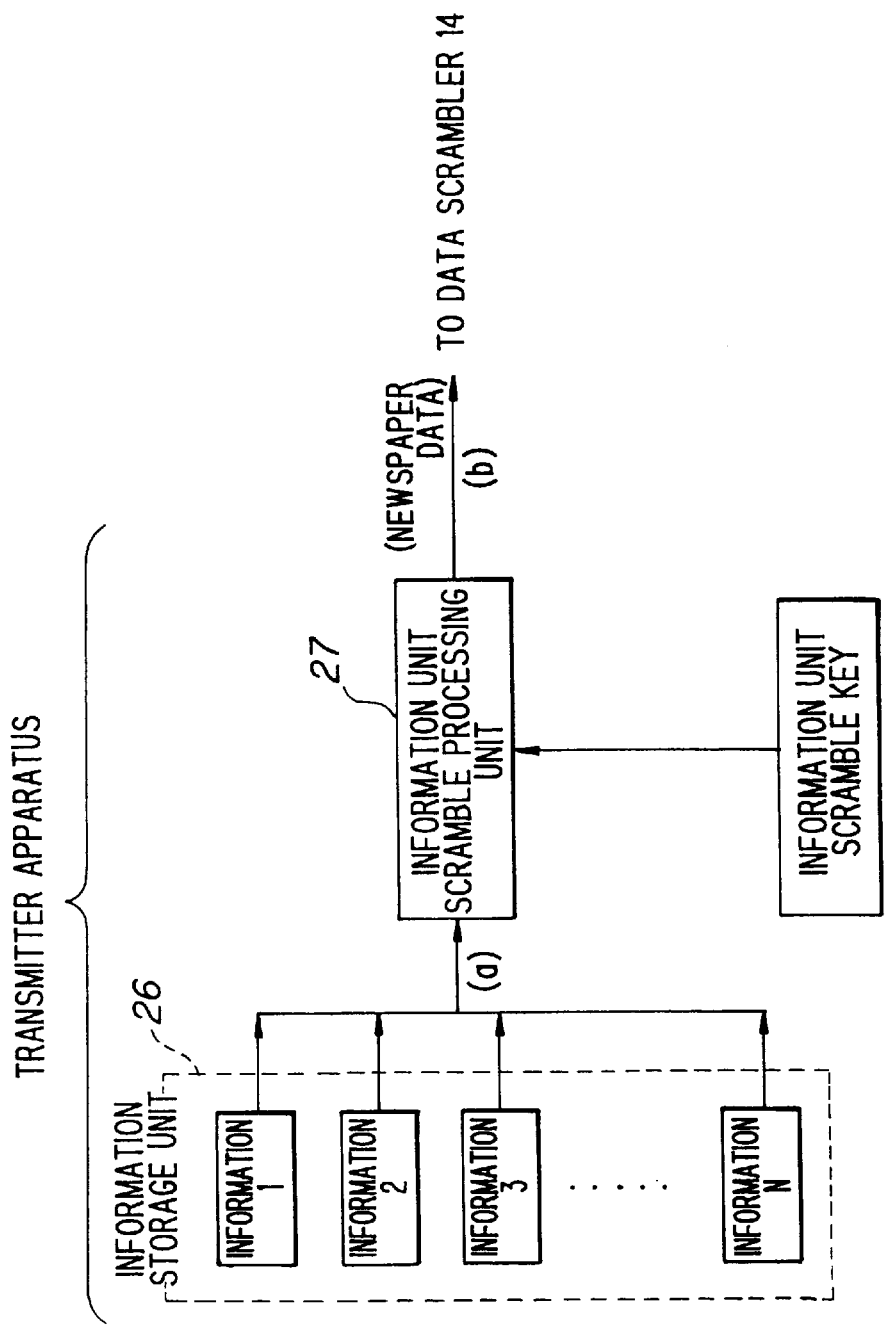
FIG. 2 is a schematic block diagram for indicating a detailed arrangement of a broadcasting station employed in a data broadcasting system.
Figure 3:
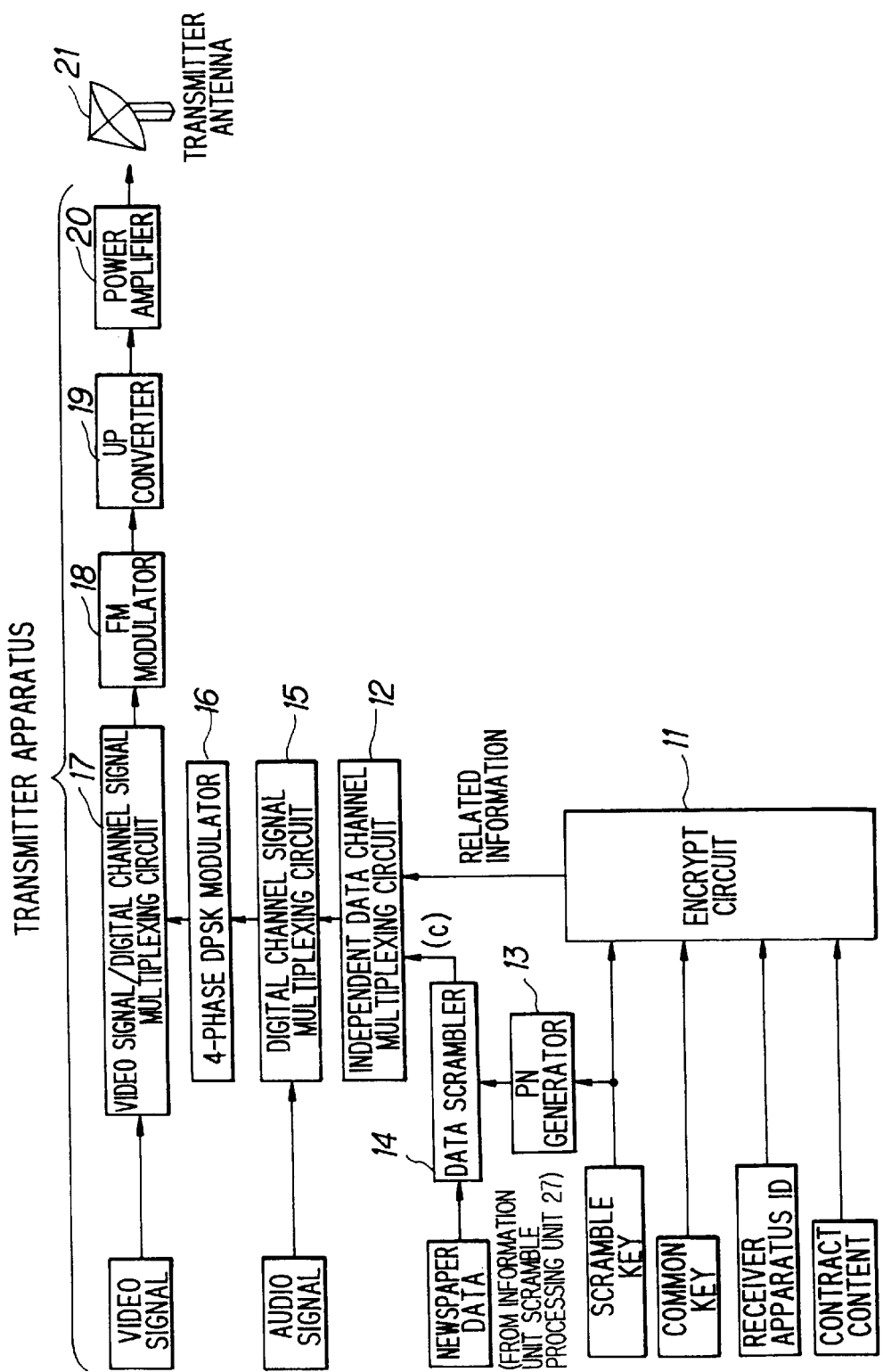
FIG. 3 is a schematic block diagram for indicating a detailed arrangement of the broadcasting station employed in a data broadcasting system.

FIG. 2 and FIG. 3 schematically indicate a detailed arrangement of the broadcasting station 3. The newspaper data transmitted from the newspaper firm corresponding to the information supplier are temporarily stored into an information storage unit 26 in accordance with a predetermined information unit (information 1, 2, ooo, N), as illustrated in FIG. 2. In other words, the newspaper data are temporarily stored into the information storage unit 26 in such page units as first page, general page, commercial page, local page, radio/television program page.

The newspaper data stored into the information storage unit 26 in the preselected information unit are supplied to an information unit scramble processing unit 27. In the information unit scramble processing unit 27, such newspaper data in a preselected information unit is selectively scrambled by using a predetermined scramble key (first key). This scramble key is such a scramble key for selectively scrambling the newspaper data in a preselected information unit, and will be referred to an "information unit scramble key" hereinafter.

That is, in this information unit scramble processing unit 27, some or all of the newspaper data stored in the information storage unit 26 in the unit of, e.g., the first page, general page, commercial page, local page, and radio/television program column are selected. Then, only the selected newspaper data are scrambled by using the information unit scramble key (first key). For instance, only the newspaper data about the commercial page or "business" news and the local page are scrambled in a similar manner to that of a data scrambler 14 shown in FIG. 3 (will be discussed later).

It should be noted that the newspaper data in a preselected information unit, which is scrambled by the information unit scramble processing unit 27 (scramble processing unit), is preset (preselected) by, for instance, the information supplier. Also, the information unit scramble key is transferred from the information supplier together with the newspaper data. Furthermore, it should be understood that either the same information unit scramble key may be employed to all of the newspaper data to be scrambled in the information unit scramble processing unit 27, or different information unit scramble keys may be employed to all of them.

The newspaper data in a predetermined information unit, which has been selectively scrambled in accordance with the above-described manner, is serialized and the serialized newspaper data is supplied to the data scrambler 14 of FIG. 3.

In the data scrambler 14, the newspaper data is scrambled in correspondence with a pseudo-random signal series outputted from a PN (Pseudo Noise) generator 13. The scrambled newspaper data is outputted from the data scrambler 14 to an independent data channel multiplexing circuit 12. The pseudo-random signal series generated from the PN generator 13 is set in accordance with the scramble key entered into this PN generator. This scramble key corresponds to such a scramble key for scrambling the entire newspaper data, and will be referred to a "transfer channel scramble key" (or second key) hereinafter.

In this case, from the newspaper firm corresponding to the information supplier, both of common information containing the above-described newspaper data, information unit scramble key, and also the transfer channel scramble key, and a data identifier (to identify newspaper data), and also such data as the unique receiver apparatus ID set to each of the data receiving apparatuses, e.g., the data receiving apparatus 6 (see FIG. 1) and the contents of the contracts are transmitted.

The transfer channel scramble key, the common information, the receiver apparatus ID and the contents of the contracts are supplied to an encrypt circuit 11 (the transfer channel scramble key is also supplied to the PN generator 13) so as to be encrypted. The encrypted data is supplied as relevant information to the independent data channel multiplexing circuit 12.

The independent data channel multiplexing circuit 12 multiplexes the scrambled newspaper data supplied from the data scrambler 14 with the relevant information supplied from the encrypt circuit 11, and the multiplexed data is outputted therefrom to a digital channel signal multiplexing circuit 15.

Also inputted to this digital channel signal multiplexing circuit 15 is an audio signal. At least a portion of this audio signal corresponds to another audio signal belonging to a video signal (which will be described later). The digital channel signal multiplexing circuit 15 multiplexes the entered audio signal (digital audio signal) with the data supplied from the independent data channel multiplexing circuit 12, and then the multiplexed data is supplied to a 4-phase DPSK modulator 16.

The 4-phase DPSK modulator 16 4-phase modulates the input data, and the modulated data is supplied to a video signal/digital channel signal multiplexing circuit 17. Furthermore, a video signal broadcasted in the broadcasting station 3 is entered into this video signal/digital channel signal multiplexing circuit 17. It should be understood that the audio signal inputted into the digital channel signal multiplexing circuit 15 is a digital signal, whereas the video signal entered into the video signal/digital channel signal multiplexing circuit 17 is an analog signal.

The video signal/digital channel signal multiplexing circuit 17 frequency-multiplexes the entered video signal with the signal supplied from the 4-phase DPSK modulator 17, and outputs the frequency-multiplexed signal to an FM modulator 18. The FM modulator 18 FM-modulates the entered signal based on a preselected carrier, and outputs the FM-modulated signal to an up converter 19. The up converter 19 frequency-converts the entered FM signal into a signal having a frequency band on the order of GHz (for example, Ku-band and Ka-band). After the FM signal derived from the up converter 19 is power-amplified by a power amplifier 20, the power-amplified FM signal is supplied to a transmitter antenna 21 and then is transmitted from this antenna 21 to the broadcasting satellite (see FIG. 1).

Figure 4:
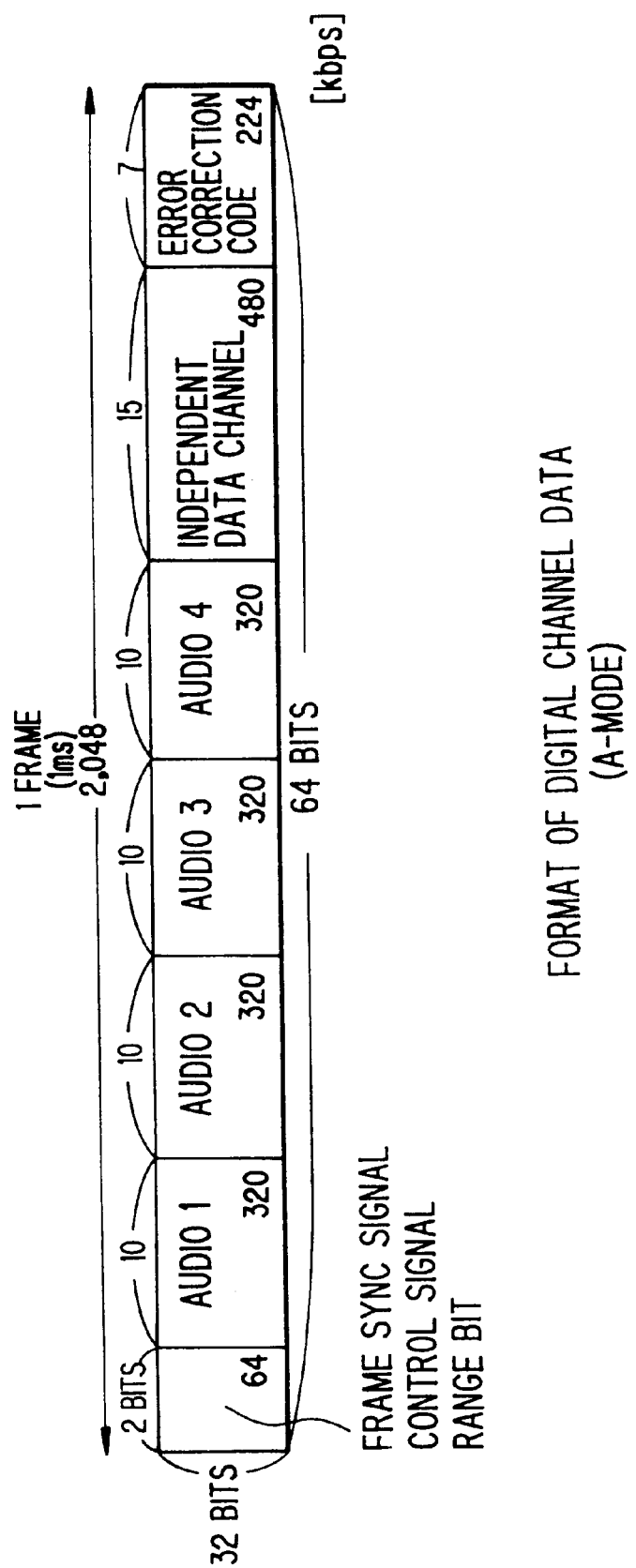
FIG. 4 explanatorily represents a format of a digital channel data used in the digital channel signal multiplexing circuit 15.

FIG. 4 represents a format (format of A mode) of the 4-phase DPSK modulated digital channel data. As shown in FIG. 4, 1 frame of data is constructed of data having 2048 bits in total, i.e., horizontal 64 bits and vertical 32 bits. Within a first range of 2 bits×32 bits, there are arranged a frame sync signal, a control signal, and a range bit signal.

Since 1 frame data is transmitted within 1 ms, the transmission rate is 2,048 M bps.

The frame sync signal corresponds to a signal for synchronizing the respective frames. The control signal contains various information for indicating that the mode corresponds to either the mode A or the mode B, and whether the television audio (sound) signal (namely, audio signal belonging to video signal, arranged in audio 1 and 2) corresponds to the stereo signal, the monophonic 1-channel signal, or the monophonic 2-channel signal. The control signal further contains information for representing whether the additional signal (arranged in audio 3 and 4) other than the television audio signal corresponds to the stereo audio signal, the monophonic 1-channel audio signal, the monophonic 2-channel audio signal, or data other than the audio signal.

As indicated in FIG. 4, the audio data from the audio 1 to the audio 4 are recorded (arranged) in a range of 10×32 bits subsequent to the first range of 2×32 bits, and another range of 10×32 bits subsequent to the first-mentioned range. It should be noted that, as described above, the data other than the audio data may be arranged in the audio 3 and 4. 32 samples of audio data are arranged in the respective ranges of 10×32 bits. That is to say, the bit number per 1 sample is selected to be 10 bits.

In the mode A, the 1-channel audio data is arranged in this range of 10×32 bits, whereas the 1-channel audio data is arranged in the range of 20×32 bits in the B mode. That is, it is possible to transmit the audio data having a higher grade in the mode B.

Subsequent to the data of the audio 4, the data on the independent data channel is arranged in the range of 15×32 bits, and the error correction code along the transverse direction is arranged in the final range of 7×32 bits.

The data in the independent data channel shown in FIG. 4 are transmitted in unit of a predetermined packet. For example, one packet is constructed of 288 bits. The first 16 bits of this packet are used as a header, the subsequent 190 bits thereof are used to arrange essential data, and the last 82 bits are used to arrange the error correction code of the packet. The header contains at least a service identification signal and an error correction code (check bit). The service identification code contains, for instance, the above-described relevant information and the code used to identify the newspaper data.

Into the independent data channel, both of the relevant information outputted from the encrypt circuit 11 shown in FIG. 3 and the newspaper data outputted from the data scrambler 14 are allocated in the packet unit, and service identification codes are set in correspondence with the data (namely, relevant information, or newspaper data) to which this packet is allocated.

At the receiver end, the transfer channel scramble key of the information supplier and the like can be detected by monitoring the packet of the relevant information (transfer channel scramble key, common information, receiver apparatus ID, contract content). Also, when the data receiving apparatus having the receiver apparatus ID contained in the transferred relevant information corresponds to the contract content, the information (newspaper data) supplied from a predetermined information supplier can be down loaded.

The above-described data are transmitted from the broadcasting station 3 of FIG. 1 to the satellite 4, and further from this satellite 4 to, for instance, each of the home receivers (contractors). In the respective home receivers, the signal transmitted from the satellite 4 is received by a receiver antenna (parabolic antenna) 5, and then is converted into a predetermined intermediate frequency signal (IF signal). This IF signal is inputted into a data receiving apparatus 6. The IF signal entered into the data receiving apparatus 6 is demodulated and the demodulated IF signal is recorded on a recording medium 8 by a recording apparatus 7.

After the newspaper data has been recorded on the recording medium 8, the contrator may read the newspaper data through the recording apparatus 7 and the receiving apparatus 6, may display this newspaper data on a monitor 10a, or may print out it on a printer 10b by operating a user terminal 9. When the recording medium 8 is detachably provided, this recording medium 8 is directly mounted on the user terminal 9, and the newspaper data recorded on this detachable recording medium may be displayed on the monitor 10a, or printed out by the printer 10b.

It should be understood that both of the receiving apparatus 6 and the user terminal 9 may be arranged in an integral form.

Figure 5:
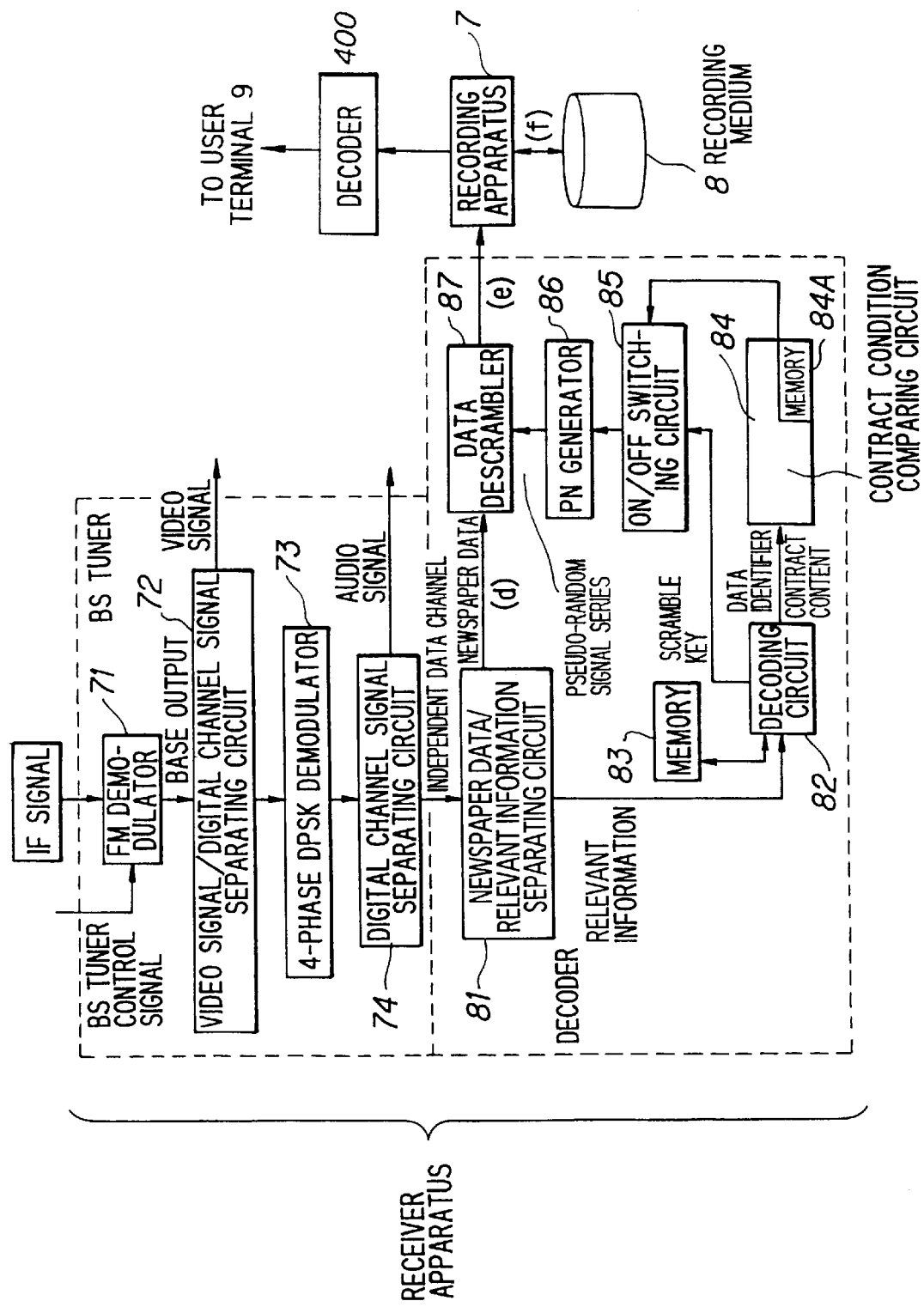
FIG. 5 is a schematic block diagram for indicating a detailed arrangement of a data receiving apparatus.
Figure 6:
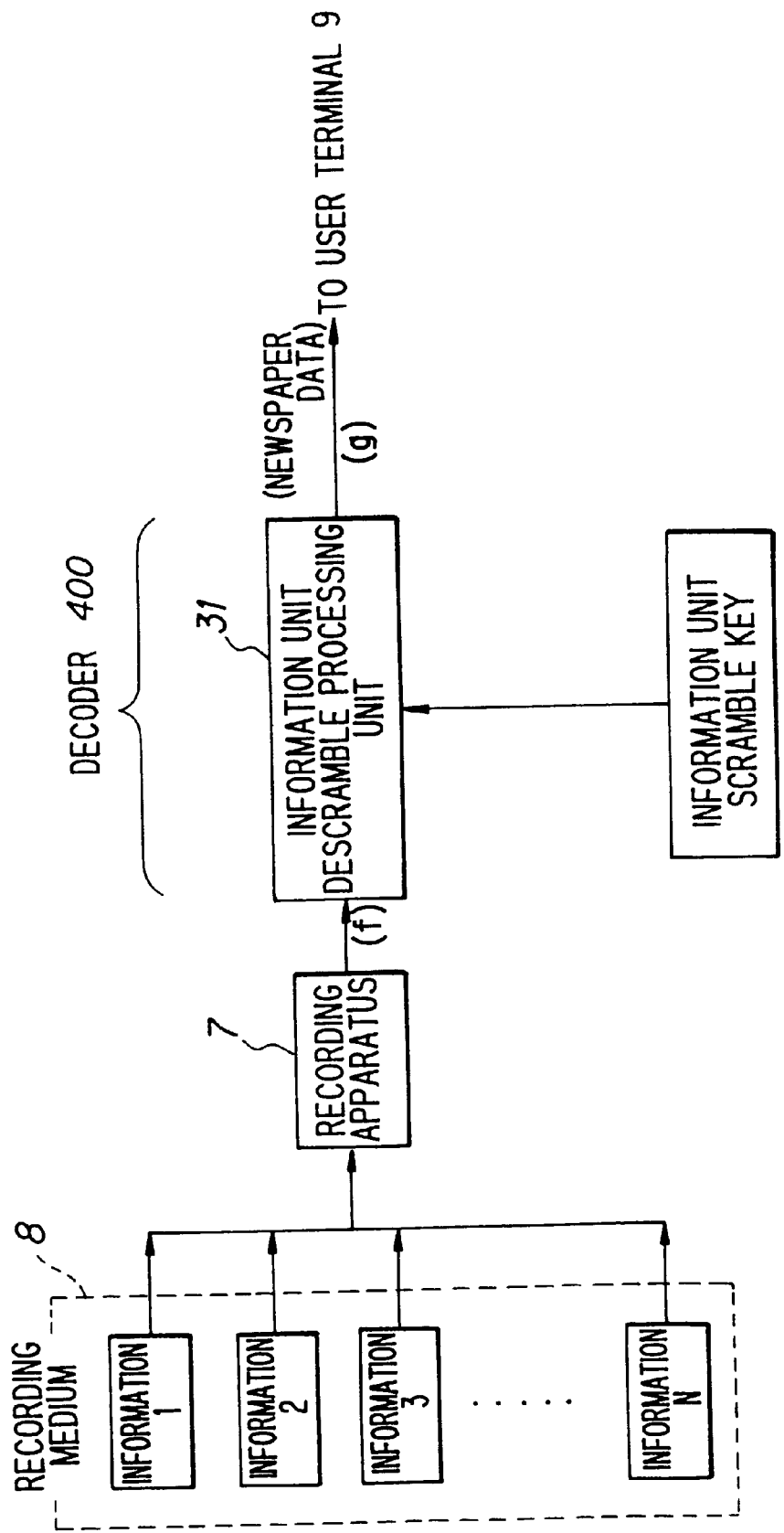
FIG. 6 is a schematic block diagram for indicating a detailed arrangement of data receiving apparatus.

Next, FIG. 5 and FIG. 6 show a detailed construction of the data receiving apparatus 6. The IF signal derived from the receiver antenna 5 is inputted into an FM demodulator 71 for constituting a BS (Broadcasting Satellite) tuner. Further, a BS tuner control signal is inputted from a channel button (not shown) into this FM demodulator 71. The FM demodulator 71 demodulates the IF signal of the channel corresponding to this BS tuner control signal to obtain a baseband signal which will then be supplied to a video signal/digital channel signal separating circuit 72. The video signal/digital channel signal separating circuit 72 separates the input baseband signal into a video signal and a digital channel signal. The video signal is outputted via, for example, the user terminal 9 (see FIG. 1) to the monitor 10a for display purposes.

On the other hand, the digital channel signal separated by the video signal/digital channel signal separating circuit 72 is entered into a 4-phase DPSK demodulator 73 so as to be demodulated. Then, the demodulated signal from the 4-phase DPSK demodulator 73 is inputted into a digital channel signal separating circuit 74 to be thereby separated into audio signals (namely,k signals arranged in audio 1 to audio 4 of FIG. 4) and an independent data channel signal. When the audio signal is the signal corresponding to the above-described video signal, this audio signal is supplied to a speaker (not shown).

The digital channel signal separating circuit 74 outputs the separated independent data channel signal to a newspaper data/relevant information separating circuit 81 which constitutes a decoder. The newspaper data/relevant information separating circuit 81 separates the entered signal into newspaper data and relevant information, and then outputs the newspaper data to a data descrambler 87 and the relevant information to a decoding circuit 82.

A unique receiver apparatus ID allocated to the data receiving apparatus 6 is previously stored in a memory 83. When the contract content of the receiver apparatus ID coincident with the receiver apparatus ID previously stored in the memory 83 is inputted as the relevant information, the decoding circuit 82 supplies this contract content to a contract condition comparing circuit 84 so as to store this contract content into a memory 84A built into this contract condition comparing circuit 84. The decoding circuit 82 decodes the transfer channel scramble key transmitted as the relevant information, and supplies the decoded scramble key to an ON/OFF switching circuit 85.

Thereafter, when the data identifier (identification code) contained in the above-described common information is decoded from the entered relevant information, this data identifier is furnished from the decoding circuit 82 to the contract condition comparing circuit 84. The contract condition comparing circuit 84 compares the inputted data identifier with the contract content previously stored in the memory 84A. This contract content contains a data identifier for the previously contracted newspaper data. The contract condition comparing circuit 84 outputs a control signal for controlling the ON/OFF switching circuit 85 to be brought into the ON state when the data identifier stored in the memory 84A is coincident with the data identifier supplied from the decoding circuit 82 unless non fee payment and other prohibit conditions are involved in the contract content. As a result, the transfer channel scramble key outputted from the decoding circuit 82 is supplied through the ON/OFF switching circuit 85 to the PN generator 86.

The PN generator 86 generates a pseudo-random signal series in response to the inputted transfer channel scramble key. A data descrambler 87 utilizes the pseudo-random signal series supplied from this PN generator 86 to descramble the newspaper data supplied from the newspaper data/relevant information separating circuit 81.

In other words, the overall newspaper data scrambled in the data scrambler 14 of FIG. 3 is descrambled by the data descrambler 87.

The newspaper data (which is selectively scrambled in a preselected information unit 9 outputted from the data scrambler 87 is supplied to the recording apparatus 7 so as to be recorded (stored) on the recording medium 8.

Thereafter, when the user terminal 9 is operated so as to read the newspaper data from the recording medium 8, as shown in FIG. 6, the newspaper data previously recorded on the recording medium by the recording apparatus 7 is read out to be supplied to the information unit descramble processing apparatus 31 for constituting the decoder 400 of the data receiving apparatus 6.

In the information unit descramble processing unit 31, the newspaper data is descrambled by employing the information unit scramble key (this descramble operation is carried out in a similar manner to the data descrambler 87 of FIG. 5). That is, in the information unit descramble processing unit 31, the newspaper data selectively scrambled by the information unit scramble processing unit 27 in a preselected information unit is descrambled.

It should be noted that the information unit scramble key is transmitted together with, for instance, the above-described transfer channel scramble key, and then these scramble keys are decoded in the decoding circuit 85 (see FIG. 5), so that the decoded scramble keys are furnished to the information unit descramble processing unit 31.

The newspaper data descrambled in the information unit descramble processing unit 31 is outputted via the user terminal 9 (FIG. 1) to either the monitor 10a, or the printer 10b for the display or print out purpose.

In FIGS. 7A–7G, there is illustrated such a condition that the newspaper data is scrambled and descrambled in the above-described data broadcasting system. It should be noted in FIGS. 7A–7G (similarly in FIG. 8 and FIG. 9) that an inclined line along the left lower direction indicates the data portion scrambled in the information unit scramble processing unit 27 (FIG. 2), and another inclined line along the right lower direction denotes the data portion scrambled by the data scrambler 14.

First, in the broadcasting station 3, as shown in FIG. 7A, the newspaper data is stored in the information storage unit 26 of FIG. 2 in a preselected information unit. This newspaper data in a predetermined information unit is selectively scrambled in the information unit scramble processing unit 27 (FIG. 2), and is further serialized, and then the serialized newspaper data is outputted (see FIG. 7B).

Here, FIG. 7B indicates such a condition that for example, information 2 is selected from the newspaper data (which includes information 1, 2, ooo, N) in a preselected information unit, and only this selected information is scrambled.

As represented in FIG. 7C, the entire newspaper data which has been selected as scrambled is scrambled by the data scrambler 14 of FIG. 3, and the resultant scrambled newspaper data is transmitted via the satellite 4 to the receiver sides.

As shown in FIG. 7D, at the receiver side, the newspaper data having the same condition as indicated in FIG. 7C is inputted into the data scrambler 87 (FIG. 5) of the data receiving unit 6. In the data scramble 87, the scrambled overall newspaper data is descrambled, so that as shown in FIG. 7E, only the information 2 as scrambled is outputted.

Then, as illustrated in FIG. 7F, this newspaper data (FIG. 7E) is separated in a preselected information unit via the recording apparatus 7, and the separated newspaper data are supplied to the recording medium 8 so as to be stored therein.

When the newspaper data stored in the recording medium 8 are read out from this recording medium 8 in the above-explained manner and are applied via the recording apparatus 7 to the information unit descramble processing unit 31 (FIG. 6), the newspaper data scrambled by the information unit scramble processing unit 27 (FIG. 2) are descrambled That is, in this case, only the information 2 among the newspaper data (information 1, 2, ooo, N) in a predetermined information unit is descrambled.

As a result, as illustrated in FIG. 7G, the newspaper data with the original predetermined information unit (namely, newspaper data shown in FIG. 7a) can be obtained.

As a consequence, a receiver who cannot receive both of the transfer channel scramble key and the information unit scramble key cannot completely observe the newspaper data, whereas a receive (contractor) who can receiver only the transfer channel scramble key can observe the newspaper data other than the information 2. On the other hand, another receiver (contractor) who can receive both of the transfer channel scramble key and the information unit scramble key can observe the entire newspaper data.

As is apparent from the foregoing descriptions, a receiver who does not wish to receive the information 2 among the newspaper data in a preselected information unit does not make a contract to receive this information 2 when he makes a contract to receive the newspaper data. Then, the information supplier sets that only transfer channel scramble key can be received but the information unit scramble key cannot be received with respect to such a contractor who has not yet made the reception contract about the information 2 (will be referred to a "partial contractor" hereinafter) among the entire contractors. Also, the information supplier sets that both of the transfer channel scramble key and the information unit scramble key can be received with respect to such a receiver who wishes to receive all of the newspaper data (will be referred to as "entire contractor" hereinafter).

Then, the newspaper data reception fee of the partial contractor is selected to be lower than that of the entire contractor.

In the view of the information supplier, there are various merits. That is, the information supplier can provide various types of service in accordance with the demands of the contractor. Namely, the information supplier can set the various information (newspaper data) with respect to each of the contractors. As a result, a total number of contractors can be increased and profit can be increased.

Figure 8:
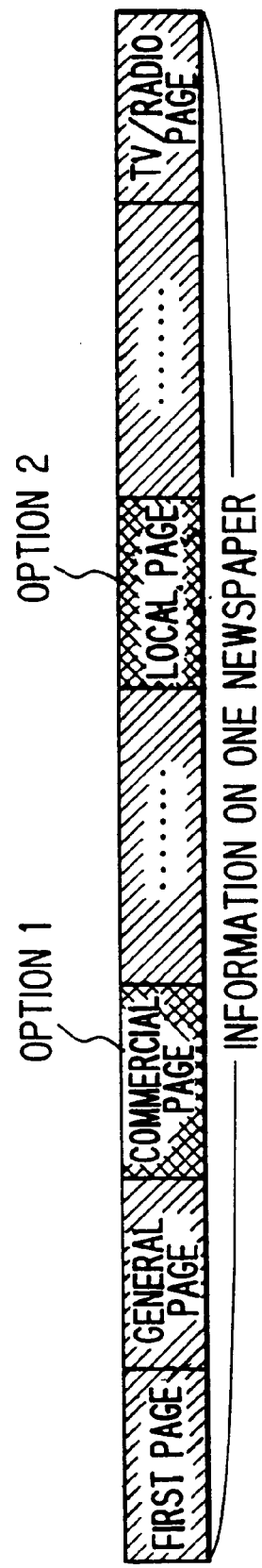
FIG. 8 explanatorily shows newspaper data scrambled in a broadcasting station of a data broadcasting system shown.

FIG. 8 shows a concrete example of the above-described scrambled newspaper data. In FIG. 8, for instance, newspaper data about one newspaper is constructed of a first page, a general page, a commercial page, . . . , radio/television column, and only the newspaper data about the commercial page and the local page are scrambled by employing the information unit scramble key. Furthermore, the entire newspaper data is scrambled by employing the transfer channel scramble key. It should be noted that the first-mentioned scramble is called as a "partial scramble", whereas the second-mentioned scramble is referred to as "entire scramble".

In this case, a receiver can make such a contract that either the entire newspaper data of this one newspaper, or the newspaper data excluding the commercial page and the local page can be received.

Moreover, it is possible to establish such contracts that either the newspaper data other then the commercial page, or the newspaper data other than the local page can be received. This may be achieved as follows. The information unit scramble keys used to partially scramble the newspaper data about either the commercial page, or the local page are different from each other. Also, such a reception contractor who wishes to receive the newspaper data excluding only the commercial page can receive both of the transfer channel scramble key and the information unit scramble key used to descramble the partial scramble of the local page. Further, such a reception contractor who wishes to receive the newspaper data excluding only the local page can receive both of the transfer channel scramble key and the information unit scramble key used to descramble the partial scramble of the commercial page (in this case, another reception contractor who wishes to receive the overall newspaper data may receive both of the transfer channel scramble key and the information unit scramble key for descrambling the partial scramble of the commercial page as well as the local page.

It should be understood that when a reception fee is defined per one month, this reception fee may be similarly charged to a contractor who regularly receives home delivery service of newspaper.

Figure 9:
FIG. 9 explanatorily indicates magazine data scrambled in the broadcasting station.

Similar to FIG. 8, FIG. 9 represents an example of data scrambled in the above-described manner. It should also be noted that FIG. 9 represents such a condition that for example, data about a certain magazine is transmitted instead of the newspaper data.

In this drawing, for example, a content of single magazine data (constructed of a commercial portion and a content of this magazine) is partially scrambled, but not entire-scrambled. Any receiver can observe only the commercial portion of this magazine regardless of whether or not he is a contractor. A contractor can observe not only the commercial portion, but also the content of this magazine.

Accordingly, in this case, the information supplier of the magazine data (e.g., publisher) may supply the commercial portion of the magazine to a large number of receivers (both of contractors and non contractors) . As a result, the number of magazine contractors may be increased, or the number of magazine buyers may be increase who wish to see the contents of this magazine. Therefore, the turn over of this magazine may be increased.

Figure 7:
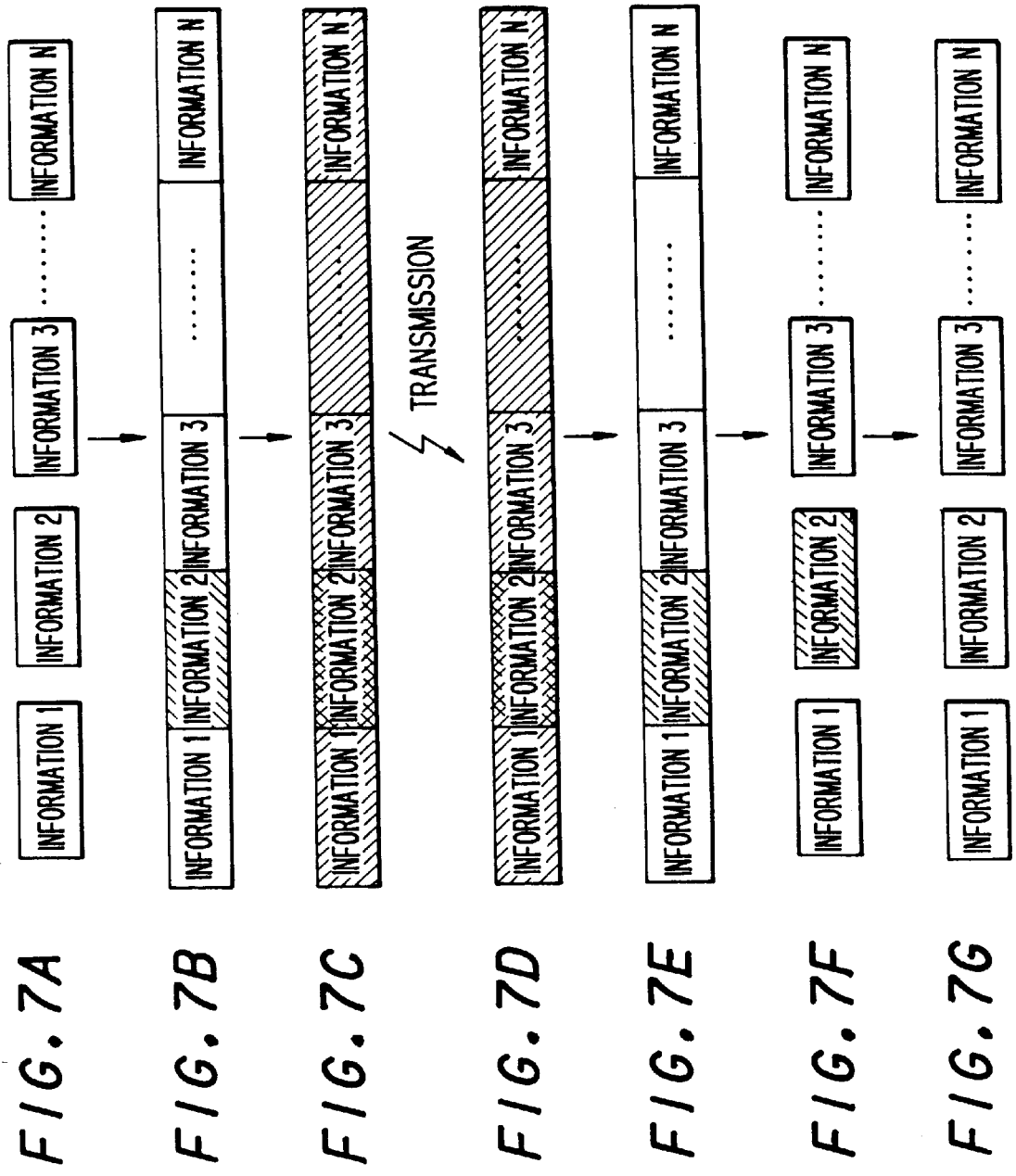
FIGS. 7A–7G, inclusive, are explanatory diagrams for explaining the scramble and descramble operations in the data broadcasting system.

As previously explained in FIG. 7, the partial contractor cannot observe the information 2 among the newspaper data recorded on the recording medium 8. However, it may be conceived that this partial contractor thereafter wants to see the information 2. Nevertheless, as previously stated, since when the newspaper (program) data is received, the scramble key (information unit scramble key) is required so as to descramble this scrambled (partially scrambled) newspaper data, if the information unit scramble key is transmitted via the satellite 4, then this information unit scramble key cannot be received before making the contract. As a consequence, such information 2 which has been received and recorded on the recording medium 8 before establishing the contract cannot be descrambled after the contract is made.

Then, as indicated by a dotted line of FIG. 1, an information unit scramble key for descrambling the partial scramble may be transmitted via, for example, a ground line such as a telephone line to the data receiving apparatus 6.

In this case, in the information unit descramble processing unit 31 (FIG. 6) of the data receiving apparatus 6, when such an information unit scramble key that is received before establishing the contract and is used to descramble the partially scrambled information 2 recorded on the recording medium 8 is received via the telephone line, the partially scrambled information 2 is descrambled by employing this information unit scramble key.

Accordingly, in this case, the information unit scramble key is acquired later on, by which the information 2 received when no contract is established can be observed.

It should be noted that since the received information unit scramble key may be recorded on the recording medium 8, the information 2 can be always observed after establishing the contract.

Figure 10:
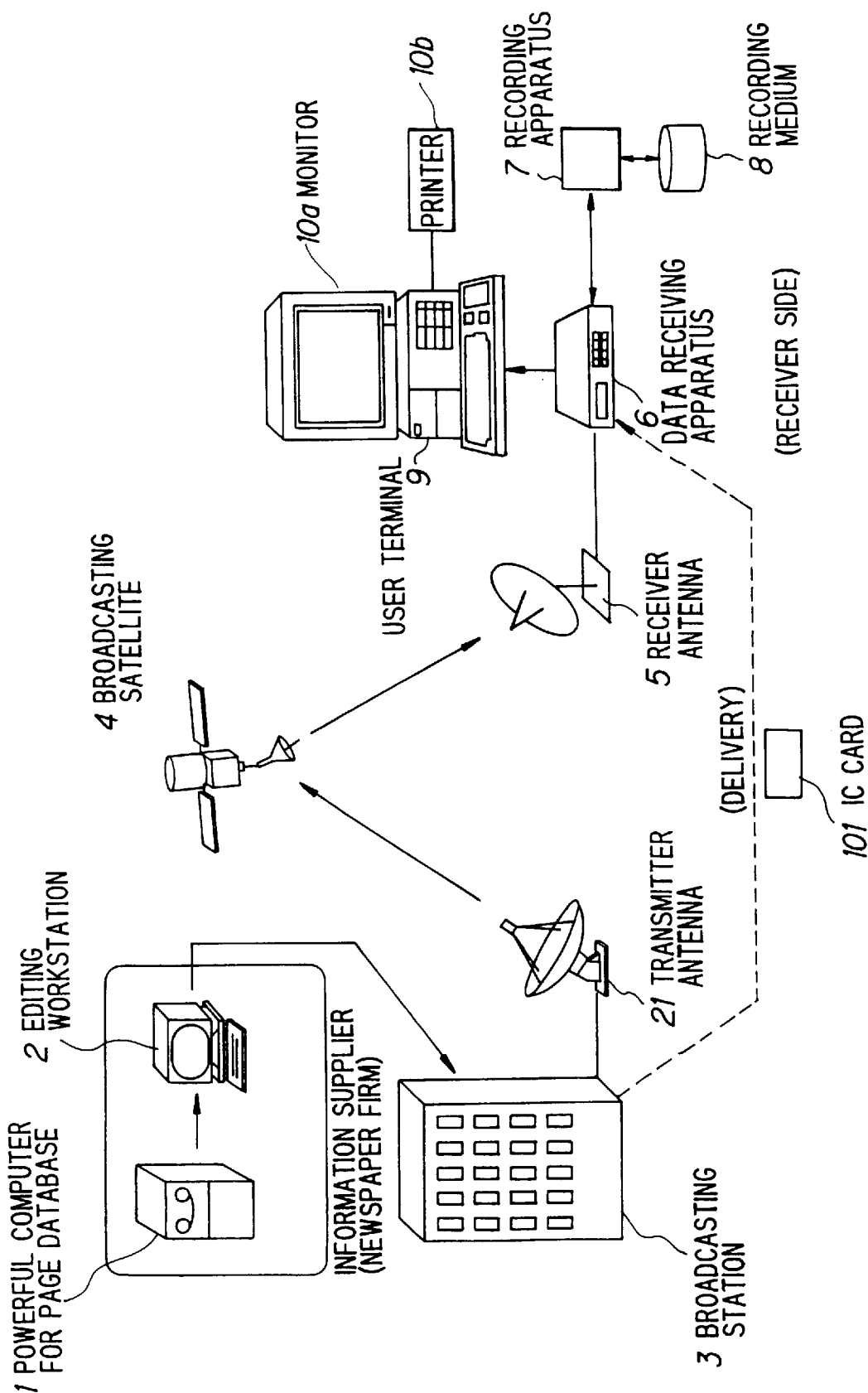
FIG. 10 is an explanatory diagram for explaining another data broadcasting system that the descramble operation is carried out with employment of an IC card.

The information unit scramble key may be transmitted, as previously explained, and also, for example, as shown in FIG. 10, may be recorded on a storage (recording) medium such as an IC card 101 (otherwise, an optical card and a memory card), which is delivered to a contractor. In this case,the storage medium such as the IC card 101 into which the information unit scramble key has been recorded is set to the data receiving apparatus. Then, this information unit scramble key is read out from this storage medium to be supplied to the information unit descramble processing unit 31 (FIG. 6).

Next, as described above, when the information unit scramble key is transmitted via the satellite line, or the telephone line, it is conceivable that a person who has made no contract may illegally acquire this transmitted information unit scramble key by way of interception. Also, when the storage medium such as the IC card 101 for storing therein the information unit scramble key is delivered, a person who has made no contract may illegally acquire this information unit scramble key by obtaining the IC card 101 from the contractor.

Thus, in order to prevent such a illegal acquisition of the information unit scramble key, the receiver apparatus ID is stored in addition to the information unit scramble key into the IC card 101. Then, the information unit scramble key is allowed to be read out from this IC card 101 only when the receiver apparatus ID stored in the memory 83 (FIG. 5) of the data receiving apparatus 6 is coincident with the receiver apparatus ID stored in the IC card 101.

Figure 11:
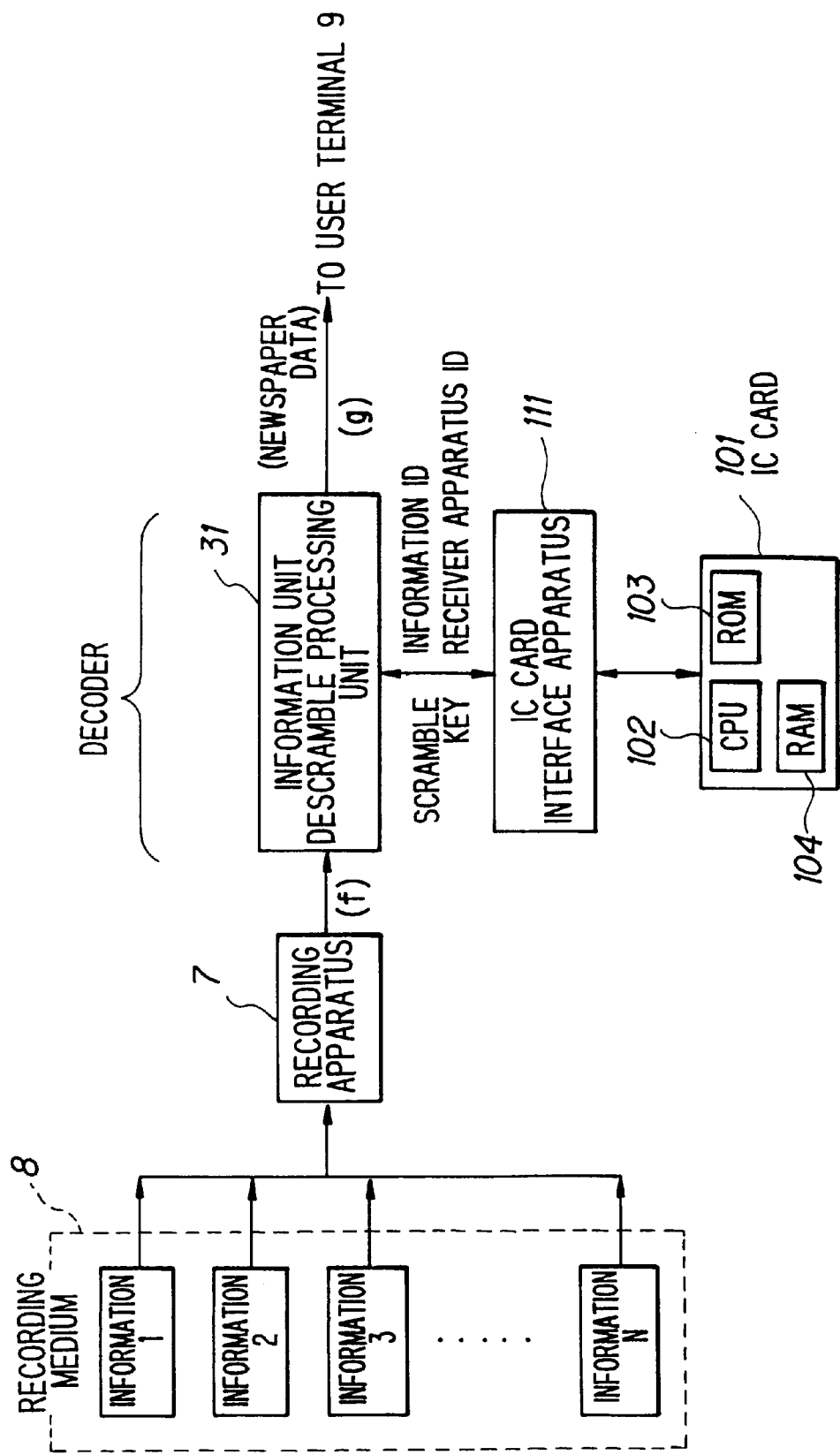
FIG. 11 is a schematic block diagram for indicating an arrangement of the data receiving apparatus in which the descramble operation is performed with employment of the IC card.

In this case, as illustrated in FIG. 11, the data receiving apparatus 6 is arranged by employing those shown in FIG. 6 and further an IC card interface apparatus 111. The IC card interface apparatus 111 is an interface to read the information unit scramble key stored in the IC card 101 and also to access to the IC card 101.

As shown in FIG. 11, the IC card 101 is constructed of a CPU 102, a ROM 103, and a RAM 104. The ROM 103 previously stores therein the receiver apparatus ID of the data receiving apparatus owned by the contractor to which this IC card 101 is delivered (in this case, the receiver apparatus ID stored in the memory 83 of FIG. 5 for the data receiving apparatus 6), and the information unit scramble key belonging to the contract (namely, information unit scramble key for descrambling the partially scrambled newspaper data of the contractor). The CPU 102 executes a process operation (which will be discussed later) in accordance with the system program and the application program stored in the ROM 103. The RAM 104 temporarily stores operation data about the CPU 102.

It should be noted that an information unit scramble key required for a preselected term (for instance, 1 month) is previously stored in the ROM 103, and the IC card 101 is delivered to the contractor before such a newspaper data whose partially scrambled data is descrambled by using the information unit scramble key stored in the ROM 103 is delivered, for instance, by way of a mail delivery. The above-described information unit scramble key is regularly, or irregularly modified so as to prevent illegal interception of newspaper (program) data, which may be similarly applied to the transfer channel scramble key. When a contractor wishes to receive other newspaper data than the contracted newspaper data, he will announce his desire to the information supplier. Then a new IC card is delivered from this information supplier to this contractor, into which such an information unit scramble key for descrambling the partially scrambled newspaper data has been previously stored.

Figure 12:
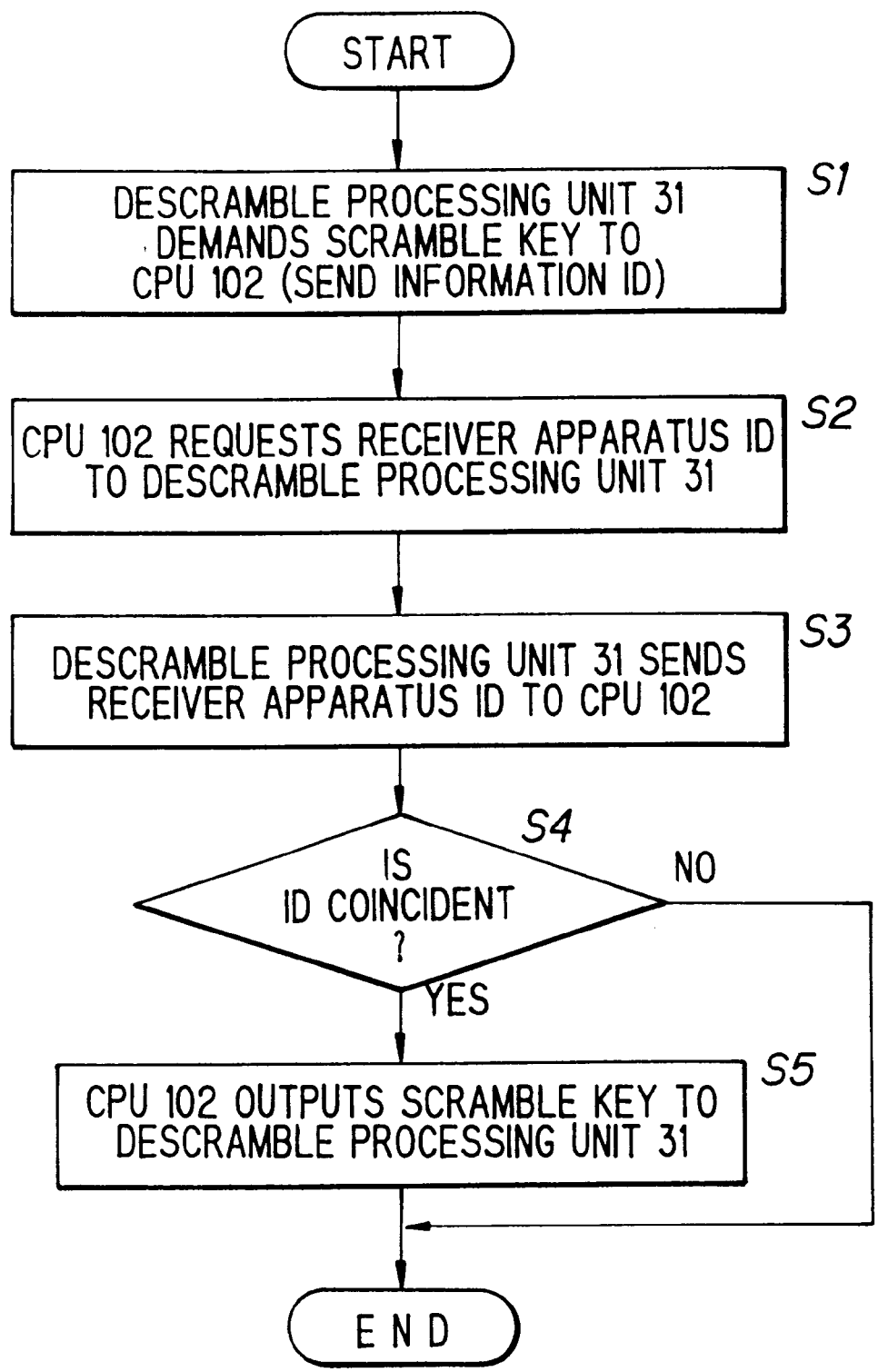
FIG. 12 is a flow chart for describing operations of a data receiving apparatus when the descramble operation is executed using an IC card.

Referring now to a flow chart shown in FIG. 12, operations of the system will be explained. When the IC card 101 is mounted on the IC card interface apparatus 111, and the partially scrambled newspaper data is entered into the information unit descramble processing unit 31, at a first step S1, a demand for outputting an information unit scramble key (information unit scramble key output demand) is issued from the information unit descramble processing unit 31 to the CPU 102 of the IC card 101.

It should be noted that at this time, the descramble processing unit 31 concurrently outputs the information ID attached to the input newspaper data in a preselected information unit to the CPU 102.

The information IDs capable of discriminating the information units have been previously attached to the newspaper data supplied from the newspaper from corresponding to the information supplier. On the other hand, the information unit scramble keys are stored in the ROM 103 of the IC card 101 in relation to the information IDs attached to the newspaper data in the predetermined information units, and these information IDs are employed to descramble the partially scrambled newspaper data. Then, at a subsequent step S5, the information unit scramble key related to the information ID outputted from the descramble processing unit 31 at the step S1 is read out from the ROM 103 under control of the CPU 102.

In this CPU 102, in combination with the information unit scramble output demand, a demand (a receiver apparatus ID output demand) is issued to the descramble processing unit 31 so as to output the receiver apparatus ID upon receipt of the information ID from the descramble processing unit 31.

When the receiver apparatus ID output demand is received from the CPU 102, the information unit descramble processing unit 31 reads out the receiver apparatus ID from the memory 83 shown in FIG. 5. Then, at a step S3, this receiver apparatus ID is transmitted from the information unit descramble processing unit 31 to the CPU 102, and the process operation is advanced to a step S4.

At this step S4, the CPU 102 judges whether or not the receiver apparatus ID stored in the ROM 103 is made coincident with the receiver apparatus ID transmitted from the information unit descramble processing unit 31. At the step S4, when it is so judged that the receiver apparatus ID stored in the ROM 103 is not coincident with the receiver apparatus ID transmitted from the information unit descramble processing unit 31, the process operation jumps over the step S5 and is then completed.

As a result, for instance, in case that a person who does not make a contract acquires the IC card 101 from one contractor and then inserts this IC card in his own data receiver apparatus, since this receiver apparatus ID is not coincident with the receiver apparatus ID stored in the ROM 103, the partially scrambled newspaper data is not descrambled.

On the other hand, at a step S4, when it is so judged that the receiver apparatus ID stored in the ROM 103 is coincident with the receiver apparatus ID transmitted from the information unit descramble processing unit 31, the process operation is advanced to a step S5. At this step S5, as previously explained, the information unit scramble key is read out from the ROM 103, and this read scramble key is outputted from the CPU 102 to the information unit descramble processing unit 31. This information unit scramble key is related to the information ID outputted by the information unit descramble processing unit 31 at the step S1. Then the process operation is completed.

As a consequence, in this case, the partially scrambled newspaper data in a preselected information unit is descrambled in the information unit descramble processing unit 31, as previously explained.

When the receiver apparatus ID is stored together with the information unit scramble key into the IC card 101, as explained above, it is possible to prevent the information unit scramble key from being illegally acquired by interception. Moreover, such an illegal condition can be avoided that a contractor illegally provides his information unit scramble key to a person who does not establish a contract.

It should be understood that when a plurality of data receiving apparatuses are installed in a single home, such IC cards for previously storing the respective receiver apparatus IDs corresponding to the plural data receiving apparatuses are delivered. In this case, even when this IC card is used in any one of the plural data receiving apparatuses, the partially scrambled data may be descrambled.

While the present invention has been described with respect to such a data broadcasting system that the newspaper data and the magazine data are transmitted via the satellite line in the above-described embodiments, the present invention may be applied to such a system capable of transmitting, for instance, publication (book) data and multimedia data constructed of combining that data, image data, and voice data. Furthermore, the present invention may also be applied to such a system (e.g., CATV system) for transmitting data via various transmission paths such as a cable network other than the satellite line.

It should also be noted that although the entire-scrambled newspaper data descrambled by the data receiving apparatus 6 are once recorded on the recording medium 8 and thereafter the partially scramble newspaper data is descrambled in this embodiment, both of the entire-descrambled newspaper data and the partially descrambled newspaper may be recorded on the recording medium 8.

In addition, after the newspaper data is partially scrambled, the overall newspaper data are entire-scrambled in the broadcasting station 3 in this embodiment. Alternatively, after the overall newspaper data may be entire-scrambled, the resultant newspaper data may be partially scrambled. In this case, after the partially scrambled newspaper data is descrambled, the resultant descrambled newspaper data are entire-descrambled in the data receiving apparatus 6.

In the above-described embodiment, the newspaper data in a predetermined information unit is partially scrambled in the selective manner. Alternatively, when the newspaper data is subdivided into predetermined data blocks, each of these data blocks may be selectively partial-scrambled. That is, when the newspaper data is subdivided into a plurality of files, the newspaper data may be selectively partial-scramble in a file unit.

Moreover, the newspaper data are entire-scrambled and partial-scrambled only once in this embodiment. Alternatively, the newspaper data may be entire-scrambled and partial-scrambled twice, or three times.

As previously described, according to the scramble apparatus of the present invention, only the desired data can be supplied to the contractor.

Further, the scramble key used to descramble the scrambled data in a predetermined block unit by the block unit scramble means is read from the storage medium. Then, the data is descrambled by the block unit descramble means with employment of this read scramble key. Accordingly, even when the data has been received before the establishment of the contract, this data can be descrambled.

Also, the preselected IDs are stored into the storage medium in addition to the scramble key. If the readout of this scramble key from this storage medium is allowed only when the ID stored in the ID storage means is coincident with the ID stored in the storage medium, then it is possible to prevent illegal use of this scramble key.

In view of the above description of the present invention, it will be appreciated by those skilled in the art that many variations, modifications and changes can be made to the present invention without departing from the spirit or scope of the present invention as defined by the claims appended hereto. All such variations, modifications or changes are fully contemplated by the present invention.

What is claimed is:

1. A data transmitting apparatus for transmitting predetermined data, comprising:

partial scramble means for scrambling a selected portion of the predetermined data using a first key;

entire scramble means for entirely scrambling all of the predetermined data, using a second key, after the selected portion has been scrambled;

sending means for transmitting the entirely scrambled predetermined data via a first transmission path; and means for sending the first key via a second transmission path.

2. A data transmitting apparatus as claimed in claim 1 wherein:

the predetermined data comprises news data.

3. A data transmitting apparatus for transmitting predetermined data according to claim 1 wherein the first transmission path comprises circuitry for transmitting the entirely scrambled data via satellite.

4. A data transmitting apparatus as claimed in claim 3 wherein the second transmission path comprises a data storage medium.

5. A data transmitting apparatus as claimed in claim 4 wherein the data storage medium comprises an integrated circuit card.

6. A data receiving apparatus for receiving predetermined data via a first transmission path, the predetermined data having a portion which has been scrambled using a first key and thereafter entirely scrambled using a second key, comprising:

entire descramble means for descrambling the entirely scrambled predetermined data using the second key; and partial descramble means for selectively descrambling the portion of the predetermined data using the first key.

7. A data receiving apparatus as claimed in claim 6, further comprising:

storage means for storing the predetermined data descrambled by the entire descramble means; and wherein the partial descramble means descrambles the portion of the predetermined data stored in the storage means.

8. A data receiving apparatus as claimed in claim 6 further comprising means for receiving the first key via a second transmission path.

9. A data receiving apparatus as claimed in claim 8 wherein the second transmission path comprises a data storage medium for storing the first key; and further comprising:

a reader for reading the first key from the data storage medium.

10. A data receiving apparatus as claimed in claim 9 wherein the data storage medium comprises an integrated circuit card.

11. A data receiving apparatus as claimed in claim 10 further comprising:

an identification storage means for storing unique identification data;

wherein the data storage medium further comprises means for storing preselected identification data; and wherein the reader includes means for comparing the unique identification data stored in the identification storage means with the identification data stored in the data storage medium and will only read out the first key from the data storage medium when the unique identification data stored in the identification storage means is the same as the identification data stored in the data storage medium.

12. A data transmission system comprising:

a transmitter for transmitting news data via satellite wherein the transmitter comprises:

an information storage unit for storing news data;

an information scramble processing unit for scrambling the news data using a predetermined first key to produce and output once scrambled news data;

a data scrambler for scrambling the once scrambled news data using a predetermined second key and outputting twice scrambled news data;

a transmitter for broadcasting the twice scrambled news data via a transmitter antenna; and a receiver for receiving the twice scrambled news data transmitted via the satellite, wherein the receiver comprises:

a data descrambler for descrambling the twice scrambled news data using the second key and outputting once descrambled news data;

a storage medium for storing the once descrambled news data;

an information descramble processing unit for reading once descrambled data from the recording medium and descrambling the once descrambled news data using the first key to produce fully descrambled news data; and a user terminal for reading the fully descrambled news data.

13. A method of transmitting news data which includes either or both of text data or graphical data via a broadcast satellite comprising the steps of:

storing the news data in a storage medium;

retrieving the news data from the storage medium;

encoding the news data once, using a first key, to produce once encoded data;

encoding the once encoded data, using a second key, to produce a twice encoded data signal; and broadcasting the twice encoded data signal via the broadcast satellite.

14. A method of receiving news data via a broadcast satellite comprising the steps of:

receiving twice encoded data via the broadcast satellite;

decoding the twice encoded data using a second key to produce once encoded data;

decoding the once encoded data using a first key to produce news data which includes either or both of text data or graphic data; and storing the news data in a storage medium.

15. A news data broadcast system comprising:

a transmitter for encoding and transmitting news data via a broadcast satellite and including:
   a storage medium for storing news data,
   a first encoder for encoding the news data using primary key data to produce primary encoded news data,
   a second encoder for encoding the primary encoded news data using secondary key data to produce secondary encoded news data; and a receiver for receiving the secondary encoded news data via the broadcast satellite and including:
   a first decoder for decoding the secondary encoded news data using the secondary key data to produce the primary decoded news data,
   a second decoder for decoding the primary decoded news data using the primary key data to produce the news data; and
   a storage medium for storing the news data.

16. A transmitter for transmitting news data via satellite comprising:

an information scramble processing unit for scrambling the news data once using a predetermined first key to produce and output first scrambled news data;

a data scrambler for scrambling the once scrambled news data again using a predetermined second key to produce and output twice scrambled news data; and transmitting circuitry for broadcasting the twice scrambled news data via a transmitter antenna.

17. A receiver for receiving news data broadcast via satellite comprising:

circuitry for receiving twice scrambled news data broadcast via satellite;

a data descrambler for decoding the twice scrambled news data using a predetermined first key and outputting first descrambled data;

a storage medium for storing the first descrambled news data;

an information descramble processing unit for reading the first descrambled news data from the storage medium and descrambling the first descrambled news data using a second key to produce a fully descrambled news data signal; and a user terminal for viewing the fully descrambled news data.

* * * * *